(12) United States Patent
Gardner et al.

(10) Patent No.: US 6,626,545 B2
(45) Date of Patent: Sep. 30, 2003

(54) LIGHT DIRECTING CONSTRUCTION HAVING CORROSION RESISTANT FEATURE

(75) Inventors: Timothy J. Gardner, St. Paul, MN (US); Richard F. Griffith, Edina, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/335,334

(22) Filed: Dec. 31, 2002

(65) Prior Publication Data

US 2003/0095332 A1 May 22, 2003

Related U.S. Application Data

(60) Continuation of application No. 09/541,203, filed on Apr. 3, 2000, and a continuation-in-part of application No. 10/028,345, filed on Dec. 20, 2001, now Pat. No. 6,508,560, which is a continuation of application No. 09/834,164, filed on Apr. 12, 2001, now Pat. No. 6,357,880, which is a division of application No. 09/425,765, filed on Oct. 22, 1999, now Pat. No. 6,264,336.

(51) Int. Cl.[7] ................................................. G02B 5/08
(52) U.S. Cl. ....................... 359/606; 359/607; 359/608; 359/599; 359/850
(58) Field of Search ................................ 359/606, 607, 359/601, 608, 599, 850, 851, 852, 497, 493; 349/57, 62, 64, 86, 112, 113; 362/31

(56) References Cited

U.S. PATENT DOCUMENTS

| 3,124,639 A | 3/1964 | Kahn |
| 3,610,729 A | 10/1971 | Rogers |
| 3,687,713 A | 8/1972 | Adams |
| 3,711,176 A | 1/1973 | Alfrey, Jr. et al. |
| 3,860,036 A | 1/1975 | Newman, Jr. |
| 4,106,859 A | 8/1978 | Doriguzzi et al. |
| 4,223,974 A | 9/1980 | Masso |
| 4,307,150 A | 12/1981 | Roche |
| 4,357,396 A | 11/1982 | Grunewalder et al. |
| 4,431,268 A | 2/1984 | Ohno et al. |
| 4,446,305 A | 5/1984 | Rogers et al. |
| 4,457,598 A | 7/1984 | Shimabukuro et al. |
| 4,520,189 A | 5/1985 | Rogers et al. |

(List continued on next page.)

FOREIGN PATENT DOCUMENTS

| EP | 0 698 804 A2 | 2/1996 |
| EP | 0 843 195 A1 | 5/1998 |
| EP | 0 883 015 A1 | 12/1998 |

(List continued on next page.)

OTHER PUBLICATIONS

Hoeji, H.K., "Design of reflectors for reflective LCDs", *Journal of the Optical Society of Korea –Korean Edition*, vol. 9, No. 6. 7 pages (Dec. 1998).

(List continued on next page.)

*Primary Examiner*—Mohammad Sikder
(74) *Attorney, Agent, or Firm*—William D. Miller

(57) ABSTRACT

The present invention is a light directing construction for use in a display apparatus. The light directing construction includes a light directing film that has a prismatic structure having two sides, where one side includes saw tooth formations having tilted surfaces, and a metal coating on the side of the prismatic substrate having the saw-tooth formations. A corrosion-resistant feature is provided on the light directing construction to minimize the effects of corrosion experienced in salt atmospheres. In a first embodiment of the invention, the light directing construction includes an intermediate layer positioned between the light directing film and the metal coating. In a second embodiment of the invention, a peripheral polymeric coating is provided on the light directing constriction. This peripheral coating can be formed with a laser.

22 Claims, 4 Drawing Sheets

U.S. PATENT DOCUMENTS

| | | | |
|---|---|---|---|
| 4,521,588 A | 6/1985 | Rogers et al. | |
| 4,525,413 A | 6/1985 | Rogers et al. | |
| 4,547,432 A | 10/1985 | Pitts et al. | |
| 4,645,714 A | 2/1987 | Roche et al. | |
| 4,666,263 A | 5/1987 | Petcavich | |
| 4,720,426 A | 1/1988 | Englert et al. | |
| 4,726,662 A | 2/1988 | Cromack | |
| 4,780,372 A | 10/1988 | Tracy et al. | |
| 4,834,857 A | 5/1989 | Gillery | |
| 4,873,139 A | 10/1989 | Kinosky | |
| 4,902,580 A | 2/1990 | Gillery | |
| 4,963,012 A | 10/1990 | Tracy et al. | |
| 5,019,458 A | 5/1991 | Elgat et al. | |
| 5,055,356 A | 10/1991 | Minowa et al. | |
| 5,140,457 A | 8/1992 | Letter | |
| 4,563,400 A | 1/1993 | Lu | |
| 5,188,760 A | 2/1993 | Hikmet et al. | |
| 5,211,878 A | 5/1993 | Reiffenrath et al. | |
| 5,215,832 A | 6/1993 | Hughes et al. | |
| 5,216,551 A | 6/1993 | Fujii | |
| 5,235,443 A | 8/1993 | Barnik et al. | |
| 5,253,105 A | 10/1993 | Paul et al. | |
| 5,269,995 A | 12/1993 | Ramanathan et al. | |
| 5,294,657 A | 3/1994 | Melendy et al. | |
| 5,296,297 A | 3/1994 | Servais et al. | |
| 5,316,703 A | 5/1994 | Schrenk | |
| 5,319,478 A | 6/1994 | Funfschilling et al. | |
| 5,325,218 A | 6/1994 | Willett et al. | |
| 5,361,172 A | 11/1994 | Schissel et al. | |
| 5,376,431 A | 12/1994 | Rowland | |
| 5,389,324 A | 2/1995 | Lewis et al. | |
| 5,448,404 A | 9/1995 | Schrenk et al. | |
| 5,486,935 A | 1/1996 | Kalmanash | |
| 5,486,949 A | 1/1996 | Schrenk et al. | |
| 5,519,542 A | 5/1996 | Yano et al. | |
| 5,543,227 A | 8/1996 | Hughes et al. | |
| 5,572,411 A | * 11/1996 | Watai et al. .................. 362/31 |
| 5,583,704 A | 12/1996 | Fujii | |
| 5,589,280 A | 12/1996 | Gibbons et al. | |
| 5,608,550 A | 3/1997 | Epstein et al. | |
| 5,612,820 A | 3/1997 | Schrenk et al. | |
| 5,629,055 A | 5/1997 | Revol et al. | |
| 5,686,979 A | 11/1997 | Weber et al. | |
| 5,699,188 A | 12/1997 | Gilbert et al. | |
| 5,721,603 A | 2/1998 | De Vaan et al. | |
| 5,724,108 A | 3/1998 | Shibata | |
| 5,744,534 A | 4/1998 | Ishiharada et al. | |
| 5,751,388 A | 5/1998 | Larson | |
| 5,767,935 A | 6/1998 | Ueda et al. | |
| 5,770,306 A | 6/1998 | Suzuki et al. | |
| 5,783,120 A | 7/1998 | Ouderkirk et al. | |
| 5,793,456 A | 8/1998 | Broer et al. | |
| 5,808,794 A | 9/1998 | Weber et al. | |
| 5,825,542 A | 10/1998 | Cobb, Jr. et al. | |
| 5,825,543 A | 10/1998 | Ouderkirk et al. | |
| 5,837,362 A | 11/1998 | O'Connell et al. | |
| 5,841,496 A | * 11/1998 | Itoh et al. .................... 349/113 |
| 5,874,174 A | 2/1999 | Okuda et al. | |
| 5,982,546 A | 11/1999 | Kawamoto et al. | |
| 6,111,697 A | 8/2000 | Merrill et al. | |
| 6,166,793 A | * 12/2000 | Hayashi et al. ............. 349/113 |
| 6,172,810 B1 | 1/2001 | Fleming et al. | |
| 6,264,336 B1 | 7/2001 | Epstein et al. | |
| 6,357,880 B2 | 3/2002 | Epstein et al. | |
| 6,503,564 B1 | 1/2003 | Fleming et al. | |
| 6,508,560 B2 | 1/2003 | Epstein et al. | |

FOREIGN PATENT DOCUMENTS

| | | |
|---|---|---|
| JP | 1 035 4634 | 8/1999 |
| JP | 11-237627 | 8/1999 |
| WO | WO 95/17303 | 6/1995 |
| WO | WO 95/17691 | 6/1995 |
| WO | WO 95/17692 | 6/1995 |
| WO | WO 95/27919 | 10/1995 |
| WO | WO 96/19347 | 6/1996 |
| WO | WO 97/01440 | 1/1997 |
| WO | WO 97/01616 | 1/1997 |
| WO | WO 97/01774 | 1/1997 |
| WO | WO 97/05521 | 2/1997 |
| WO | WO 97/32226 | 9/1997 |
| WO | WO 98/22953 | 5/1998 |
| WO | WO 98/24230 | 6/1998 |
| WO | WO 99/04604 | 1/1999 |
| WO | WO 99/21913 | 5/1999 |
| WO | WO 99/28258 | 6/1999 |
| WO | WO 99/56158 | 11/1999 |

OTHER PUBLICATIONS

Chen, P.C. et al., "Plated Cu Line Thickness Effects On Peel Test Values", *Society of Vacuum Coaters*, pp. 205–211 (1990).

Clabburn, R.J.T. et a., "Asymmetric Reflective Difusers for Hand–held Displays", Microsharp Corporation Limited, Swindon, U.K. (1999).

Kittler, W.C., "Metal and Metal–Dielectric Coatings For Solar Control and Radiation Shielding", *Society of Vacuum Coaters*, pp. 118–125 (1987).

Schrenk, W.J. et al., "Nanolayer polymeric optical films", *Tappi Journal*, pp. 169–174 (Jun. 1992).

* cited by examiner

LIGHT DIRECTING CONSTRUCTION HAVING CORROSION RESISTANT FEATURE This application is a continuation of U.S. patent application Ser. No. 09/541,203, filed Apr. 3, 2000, and a continuation-in-part of U.S. patent application Ser. No. 10/028,345, filed Dec. 20, 2001, now U.S. Pat. No. 6,508,560, which is a continuation of U.S. patent application Ser. No. 09/834,164, filed Apr. 12, 2001, now U.S. Pat. No. 6,357,880, which is a divisional of U.S. patent application Ser. No. 09/425,765, filed Oct. 22, 1999, now U.S. Pat. No. 6,264,336. Each of these applications and patents is incorporated herein by reference.

FIELD OF THE INVENTION

The present invention is directed to a light directing arrangement and method for use with a display apparatus, and more particularly to a light directing arrangement that directs an image to an angle different from a glare angle and is resistant to corrosion.

BACKGROUND OF THE INVENTION

Liquid crystal displays (LCDs) are used in many different types of electronic devices, including portable computers, cellular phones, and digital watches. One class of LCD, which is substantially reflective, often includes a reflector for directing ambient light to the viewer. Another class of LCD often includes a partially transmissive reflector for also allowing light from a light source within the device to convey information to the viewer. A partially transmissive reflector is commonly called a transflector, and an LCD that incorporates a transflector is commonly called transflective. The reflector may be made of metal or other types of composite materials. Some examples of LCD devices are discussed in co-pending application, "Optical Devices Using Reflecting Polarizing Materials", Ser. No. 09/298,003, filed Apr. 22, 1999.

SUMMARY OF THE INVENTION

The present invention is a light directing construction that utilizes a structure that protects against corrosion initiated by salt environments. The present invention is not directed to the increase of adhesion between the various layers of the light directing construction. More particularly, the corrosion resistant features disclosed herein are directed at removing at least one of the three components that together lead to a particular type of corrosion in this construction: salt, water, and an oxidizer. Removal of at least one of these components from the intimate environment of the light directing construction minimizes, and preferably eliminates, corrosion.

The light directing construction includes a light directing film and a thin transflective layer of metal disposed on the light directing film. The light directing film includes a three-dimensional prismatic structure made from UV-curable organic materials; the prismatic structure has two sides, where one side includes saw-tooth formations with tilted surfaces. The transflective metal coating is disposed on the side of the prismatic structure with the saw-tooth formations.

The light directing construction further includes a corrosion resistant feature that minimizes any corrosion that may occur between the metal coating and the prismatic structure when the light directing construction is exposed to a salty environment. In one embodiment of the present invention, an intermediate layer is positioned between the light directing film and the metal coating. This intermediate layer can be a thin metal coating between the light directing prismatic structure and the thin metal coating. The intermediate layer metal can be selected from one or more of chromium, nickel, iron, aluminum, titanium, silver, gold, zirconium, platinum, alloys containing these metals, and other metals. Preferred intermediate layer metals are alloys of nickel-chromium and nickel-chromium-iron at a thickness of about 2 to 40 angstroms.

In another embodiment, a polymeric peripheral coating is provided on the outer circumference of the light directing construction, thereby sealing the open edges of the construction and the points of entry of any corrosion initiating reagents. In a preferred aspect, the polymeric peripheral coating is provided by using a laser beam. The laser beam melts at least partially the outermost edges of the light directing construction, thereby creating flowable material that seals the outer edges of the construction. The laser beam can be used simultaneously to cut the light directing construction to a desired shape and size and provide the edge sealing.

The prismatic structure that provides the base for the display apparatus is formed of UV-curable cross-linked resin, such as an epoxy-acrylate. The three-dimensional, tilted surfaces of the prismatic layer may have a tilt angle of about 1° to 35° from horizontal. The saw-tooth formations may have a repeat distance of at least about 5 micrometers, and no greater than about 200 micrometers.

The transflective metal coating, which is disposed on the structured surface of the prismatic structure, can be silver, chromium, nickel, aluminum, titanium, aluminum-titanium alloy, gold, zirconium, platinum, palladium, aluminum-chromium alloy, rhodium, or combinations. The transflective metal coating is preferably silver, is typically no thicker than 400 Angstroms, and has at least 10% or greater transmission of visible light.

The light directing construction, which includes the light directing film, the transflective metal coating, and the corrosion resistant feature, further can include an inorganic protective layer formed on the transflective metal coating, wherein the inorganic protective layer inhibits molecular transfer to the metal coating from the atmosphere and balances the color of reflected and transmitted light. The inorganic protective layer can include titanium, indium tin oxide, zinc sulfide, tin oxide, indium oxide, titanium oxide, silicon dioxide, silicon monoxide, or magnesium fluoride.

Further, the light directing construction can include a polymer barrier layer or polymer protective layer to inhibit molecular transfer to the transflective metal coating. This layer can be selected from the group consisting of cross-linked epoxy resin, cross-linked or linear acrylic resin, epoxy acrylate, polyester, polyethylene, polyvinylidene chloride, and polyvinyl alcohol.

A pressure sensitive adhesive layer furthers can be provided between a polarizer and the inorganic protective layer. The pressure sensitive adhesive layer overlying the inorganic protective layer may be an acrylate/acrylic acid adhesive layer, the adhesive layer being optically diffuse. The pressure sensitive adhesive layer may include optical diffuser particles.

The light directing film of the present invention, with any of the optional coatings and features, can be incorporated into a display apparatus.

In one specific embodiment, the present invention is directed to a light directing construction, comprising a prismatic structure having first and second surfaces, the second surface including saw-tooth formations having tilted surfaces; the prismatic structure made from a non-halogenated UV polymerizable composition; a transflective metal coating is provided proximate to the saw-tooth formations; the transflective metal coating having a transmission of at least 10% of visible light; and a corrosion resistant feature disposed proximate to each of the metal coating and the prismatic structure, the corrosion resistant feature providing a decrease in the sum of transmission and reflection of visible light of less than 5%. In some embodiments, the decrease in the sum of the transmission and reflection is less than 2%.

In one embodiment, the corrosion resistant feature is an intermediate layer disposed between the prismatic structure and the transflective coating. In another embodiment, the corrosion resistant feature is a polymeric coating disposed on the periphery of the construction. This polymeric coating can be formed when the construction is cut with a laser.

BRIEF DESCRIPTION OF THE DRAWINGS

The invention may be more completely understood by considering the detailed description of various embodiments of the invention which follows in connection with the accompanying drawings.

Figure 1:
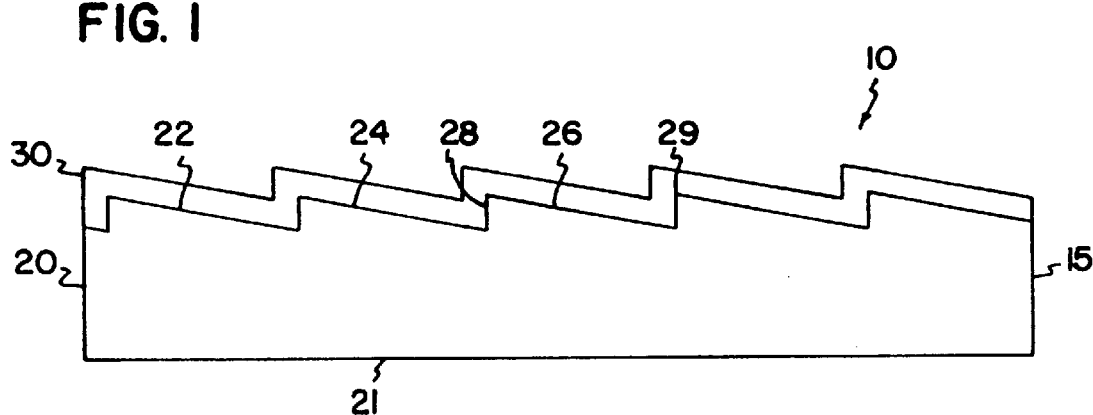
FIG. 1 is a cross-sectional, enlarged view of a light directing construction.

While the invention is amenable to various modifications and alternative forms, specifics thereof have been shown by way of example in the drawings and will be described in detail. It should be understood, however, that the intention is not to limit the invention to particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

The present invention is believed to be applicable to a variety of systems and arrangements that direct light away from a glare angle and inhibit corrosion of a reflective or transflective metal coating in a display. The invention has been found to be particularly advantageous in application environments where a transflective display is needed, that is, a display that is capable of being illuminated by an ambient light source or by a light source within or behind the display. While the present invention is not so limited, an appreciation of the various aspects of the invention is best gained through a discussion of the various application examples.

Figure 2:
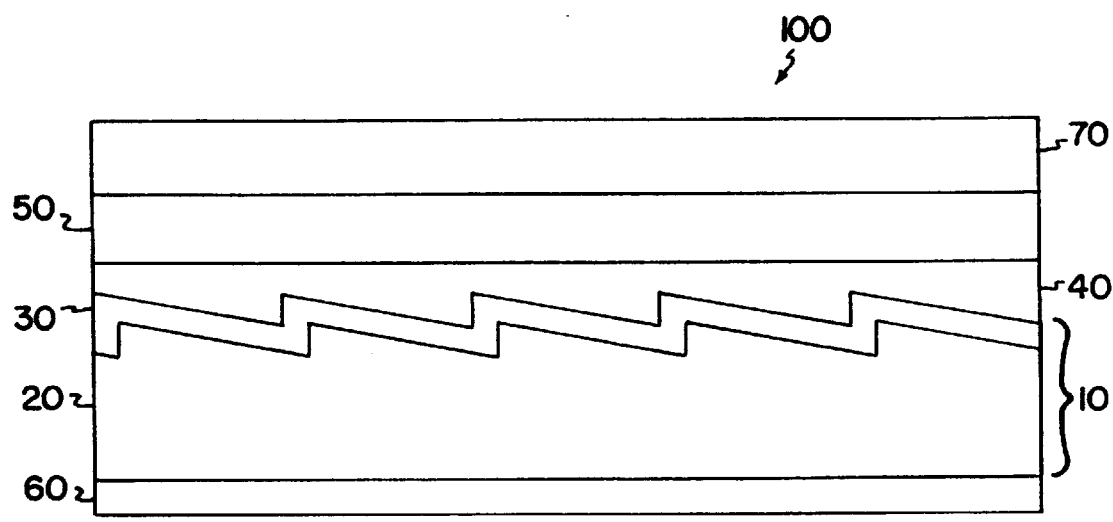
FIG. 2 is the light directing construction of FIG. 1 having optional layers disposed thereon.

A tilted mirror film or a light directing construction 10 is shown in a detailed cross sectional view in FIG. 1. The light directing construction 10 has a prismatic light directing film or structure 20 and a thin metal coating 30. In FIG. 2, the light directing construction is shown with various optional layers disposed on the construction.

Prismatic Light Directing Film

The prismatic light directing film 20 has a first surface 21 and an opposed second surface 22. Second surface 22 has a prismatic structure of saw tooth formations 24 comprising titled surfaces 26 and rises 28.

In order to accomplish the redirection of the optimal viewing angle, the tilted surfaces 26 have a tilt angle t of about 1° to 35° from the first surface 21 (which can be considered as the "horizontal" surface for the present purposes) in one embodiment. Preferably, the tilted surfaces have a tilt angle of about 3° to 12°, and most preferably, the tilt angle t will be about 6–9°. These preferred tilt angles are determined based on the typical viewer scenario mentioned above, and are also dependent on the qualities of a particular LCD.

In many applications, it is desirable that the repeat distance of the saw tooth formations 24 is small enough that the saw tooth formations are not perceptible to the human eye at a typical viewing distance. The repeat distance also may be defined as the horizontal distance between the peaks of the saw tooth formations. However, the saw tooth formations 24 should be large enough to be capable of being reliably formed. The smaller the formation, the more difficult the production procedures for manufacturing the prismatic layer. In a hand-held LCD with a typical viewing distance of about 40 to 60 cm, the repeat distance in one embodiment ranges from about 5 micrometers or more to about 200 micrometers or less. More preferably, the repeat distance may range from 30 micrometers to about 80 micrometers. Most preferably, the saw tooth formations have a repeat distance of about 50 micrometers. However, where the display is much larger and viewed from a greater distance, such as for a billboard or roadside sign, the repeat distance may be substantially larger.

The prismatic light directing film 20 is a cured product of a UV-curable or UV polymerizable resin composition, preferably, a UV polymerizable epoxy-acrylate. The second surface 22 of the light directing film 20 is preferably pinhole free and provides smooth surfaces for deposition of thin metal coating 30. The light directing film 20 is preferably highly transmissive of visible light, scratch resistant, and has low outgassing. Preferably, the cured structure retains the saw tooth form without shrinkage when cured and when exposed to heat and humidity.

The UV polymerizable composition that results in the light directing film 20 is generally non-halogenated; halogen agents may cause corrosion of the metal layer, and thus it is desired that the composition include no halogenated materials. In some compositions, a minuscule amount of a halogenated material may be present in the composition, for example, as a component of a surfactant or other additive that is present in a low amount, such as less than about 1%. The amount of any material that includes a halogenated portion should not be prevalent to a level that would degrade the adhesion of the metal coating 30 to the light directing film 20. In fact, the actual level of the halogen atom, itself, in the composition should be less than about 0.2 weight percent of the total composition, preferably less than about 0.15 weight percent, and most preferably less than about 0.1 weight percent. In some embodiments, such as when the halogen is bromine, the level in the total composition should be less than about 0.1 weight percent, preferably less than 0.01 weight percent, and most preferably not even present (i.e., zero weight percent). For the purposes of this invention, UV polymerizable compositions that have a halogen atom level of less than about 0.2 weight percent can be considered non-halogenated.

The non-halogenated UV polymerizable composition for making the light directing film 20 includes a vinyl monomer, for example, an alkyl styrene monomer such as methyl styrene, and various co-monomers and/or oligomers. In one example, the composition comprises each of bisphenol-A epoxy diacrylate, novolak epoxy acrylate, and a vinyl monomer, which includes alkyl styrenes (for example, methyl styrene); such a composition is considered an "epoxy acrylate". An initiator may be added to provide a free radical source to initiate polymerization of the composition to a polymerized structure.

One example of a preferred UV polymerizable epoxy acrylate composition for use in the prismatic structure includes the following components, which are listed with a range of percentage weight: bisphenol-A epoxy diacrylate (55–80%), acrylated epoxy (1–10%), methyl styrene (5–25%), a photoinitiator (0.25–5%) (such as Lucirin TPO), and a fluorosurfactant (0.1–0.3%). Further, the composition can include a second photoinitiator, such as Irgacure 184, at a percentage weight up to about 5%. Although the fluorosurfactant in this preferred composition is a halogen, it is relatively inert, present in only small quantities, and at least partially evaporates when the metal coating is formed on the prismatic layer. Additional details regarding these preferred UV-curable compositions can be found in U.S. patent application Ser. No. 09/425,270 (Fong), filed Oct. 22, 1999, and incorporated herein by reference.

The saw tooth formations 24 of light directing film 20 can be made by many different methods known in the art, such as by applying the polymerizable composition between a substrate and a tool having saw tooth formations and polymerizing the composition under UV radiation, and then separating the sheet from the tool. Other methods for forming prismatic structures are also known and may be utilized in the present invention. Because of the small size of the saw tooth formations 24, the process of producing the three-dimensional structure is often referred to as "microreplication". For additional information regarding microreplication of three-dimensional structures, see for example, U.S. Pat. No. 5,183,597 (Lu), which is incorporated herein by reference.

An example of a microreplicated prismatic structure, i.e., the saw tooth pattern, has a 6–7° tilt angle and a 50 micrometer repeat distance, and has a peak to valley thickness in the range of 6–7 micrometers. That is, referring to FIG. 1, titled surface 26 is at an angle of about 6–7° in relation to first surface 21, rise 28 has a height of about 5–7 micrometers, and the distance between adjacent peaks 29 is about 50 micrometers. The prismatic structure may include a base or "land portion" at the base of the saw tooth formations 24 that is a flat layer component underneath the triangle portions. The land portion of the prismatic structure may be in the range of 0 to 3 micrometers, and may depend on the process used to form the prismatic structure. Preferably, the land portion of the prismatic structure has a thickness of about 0.5 micrometers.

Transflective Metal Coating

The metal coating 30 is formed on the prismatic light directing film 20, in particular, on the saw tooth structures 24. Throughout the text, the words "formed on", "formed over" and the like will be used to refer to a layer that is formed on top of, but not necessarily directly adjacent to, another layer. Accordingly, the metal coating 30 may not be directly adjacent to the prismatic structure.

The metal coating 30 is formed on the saw tooth formations 24 of the light directing film 20 and is preferably highly reflective and partially transmissive; metal coating 30 is a transflective coating, meaning that it allows at least partial transmission of visible light in addition to its reflective properties. The metal coating may be composed of many different materials capable of forming reflective layers including, for example, one or more of: silver, chromium, nickel, aluminum, titanium, gold, zirconium, platinum, palladium, rhodium, or various alloys thereof. Silver is most preferred for its low light absorption, meaning that the sum of the reflectivity and the transmissivity of silver is high compared to other materials.

The metal coating can be formed on the prismatic substrate using many different methods that are known in the art, including vacuum deposition or plating. Suitable vacuum deposition techniques include sputtering, evaporation plasma deposition, and cathodic arc deposition. Plating techniques such as electroplating or solution plating could also be used. The transflective metal coating 30 can have a thickness of about 25 angstroms to about 3000 angstroms, and is typically about 300 to 400 angstroms thick. Preferably, the metal coating has a relatively uniform thickness.

In the preferred embodiment, the metal coating is a silver layer providing a transmission of at least about 10% of visible light. Generally, such a metal coating is about 360–400 angstroms thick.

In FIG. 2, light directing construction 10 (which includes light directing film 20 and thin metal coating 30) is incorporated into a light display apparatus 100. Light display apparatus 100 may include various layers in addition to the light directing construction; light display apparatus 100 includes polymer protective layer 40, pressure sensitive adhesive layer 50, polymeric substrate 60, and polarizer 70. Each of these layers will be discussed in later detail.

Corrosion Resistant Features

In accordance with the present invention, the light directing construction includes a prismatic light directing film 20, a thin metal coating 30, and a corrosion resistant feature. This corrosion resistant feature is provided either on or within the light directing construction in order to increase the construction's tolerance to salt in the surrounding atmosphere. Atmospheres with high airborne salt concentrations include areas close to large expanses of salt water. Additionally, certain industrial processes can create high salt concentrations. Humans also are a source of salt; for example, tears and perspiration include low, yet harmful, concentrations of salt.

It has been found that in atmospheres having some salt concentration, the light directing construction is susceptible to corrosion between the light directing film 20 and the transflective metal coating 30. Any corrosion typically begins at the outer periphery of the light directing construction. Small amounts of corrosion can result in a darkening of the metal coating 30 in spots near the edge. If large amounts of corrosion occur between the prismatic film 20 and the thin metal coating 30, there is a tendency for the transflective metal coating to delaminate from the prismatic structure. In some embodiments, total delamination may occur, with the metal coating becoming essentially clear in its newly oxidized state (i.e., has little or no darkening). Even without total delamination, either darkening or delamination results in an unacceptable product.

It is believed that the corrosion, and possible resulting delamination, is caused by the reaction of an oxidizing species with the thin metal coating. The presence of the salt ions increases general ionic mobility and conductivity. The oxidizing species responsible for this reaction could be oxygen that is trapped at either the interface between the light directing film 20 and the thin metal coating 30 or at the periphery of the layers, or the oxidizing species may be present in the light directing film 20. In particular, this may be possible if all the UV-curable compounds have not completely reacted. For example, an acrylate epoxy material might have amounts of unreacted epoxide.

It is believed that in order for corrosion to occur at the reflective metal film/prismatic film interface, the light directing construction must be exposed to the combination of three components, salt, water, and an oxidizer. If one of these components is not present, corrosion should not occur. The present invention is directed to removing at least one of these components from the immediate environment of the interface; typically, it is the salt or water, or both, that is removed.

It has been found that light directing constructions 10, with the light directing film 20 made from UV polymerizable compositions, in particular acrylate epoxy compositions, are not particularly susceptible to this redox reaction when all three elements are not present. Thus, the present invention provides a corrosion resistant feature that halts the exposure of the light directing constructions to at least one of these elements, typically, salt. It is desired that any corrosion resistant feature is substantially transparent to visible light. That is, the sum of the of light transmission and reflection losses due to the corrosion resistance feature is preferably no greater than 2%, more preferably no greater than 1.5%, and even more preferably no greater than 1%, when compared to the light directing construction without the corrosion resistant feature. In some embodiments, the light transmission loss is no greater than about 0.5%. In some embodiments, however, a loss of up to about 5% of the sum of the transmission and reflection may be acceptable.

Figure 3:
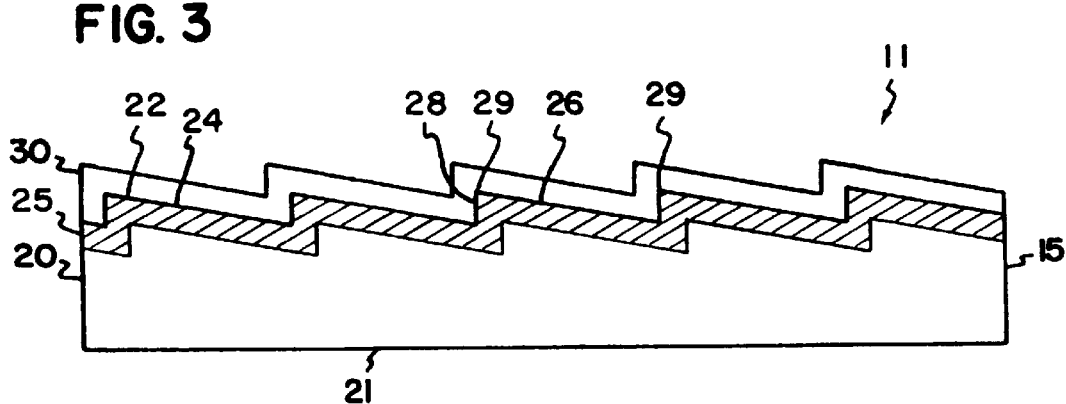
FIG. 3 is a cross-sectional, enlarged view of a light directing construction according to a first embodiment of the present invention.

In a first embodiment of the present invention, shown in FIG. 3, a corrosion resistant intermediate layer, is positioned -at the interface between the light directing film and the metal coating. This intermediate layer 25 is a thin coating, preferably a thin metal coating, provided on the light directing prismatic structure prior to applying the thin metal coating. In a second embodiment, shown in FIG. 5, a corrosion resistance feature such as a peripheral coating 35 is provided on the outer edges 15 of the light directing construction, thereby sealing the open edges.

Referring to intermediate layer 25 in FIG. 3, intermediate layer 25 is disposed within light directing construction 11 between prismatic light directing film 20 and thin metal coating 30. Intermediate layer 25 can be any material that has sufficient adherence to the light directing layer 20 and to thin metal coating 30. Examples of materials for intermediate layer 25 include organic materials, such as polymers, and metals.

If intermediate layer 25 is a metal intermediate layer, the metal is preferably selected from one or more of the group consisting of chromium, nickel, iron, aluminum, titanium, silver, gold, hafnium, zirconium, tantalum, niobium, tungsten, platinum, vanadium, molybdenum, tin, palladium, rhodium, alloys containing these metals, and other metals. The selected intermediate layer material is generally corrosion-resistant and is not affected by the presence of the salt ions in the atmosphere.

One preferred intermediate layer material is titanium. Other preferred intermediate layer metals are alloys of nickel and chromium (such as "Lumalloy™", a material commercially available from C.P. Films of Martinsville, Va.), and nickel-chromium-iron (such as "Inconel 600", which is also available from C.P. Films). Other alloys of nickel and chromium also can be used.

A metal intermediate layer may be provided on the light directing film 20 by vapor deposition, including plasma deposition and cathodic arc deposition, sputtering, plating, and the like.

It is advantageous to provide an intermediate layer that is substantially transparent to visible light; that is, the sum of the of light transmission and reflection lost due to the intermediate layer is preferably no greater than 2%, more preferably no greater than 1.5%, and even more preferably no greater than 1%, when compared to the light directing construction within the intermediate layer. In some embodiments, the light transmission loss is no greater than about 0.5%. However, in some embodiments it may be acceptable to have a larger loss, such as for example, 4% or 5%.

To provide an intermediate layer 35 with acceptable transmission and reflection levels, the thickness of the intermediate layer is preferably about 5 to 50 angstroms. This thickness, however, will depend on the material used for the intermediate layer. For example, an intermediate layer of titanium preferably has a thickness of about 20 to 40 angstroms; an intermediate layer of "Lumalloy" preferably has a thickness of about 10 to 40 angstroms; and a layer of "Inconel" preferably has a thickness of about 10 to 40 angstroms.

Figure 4:
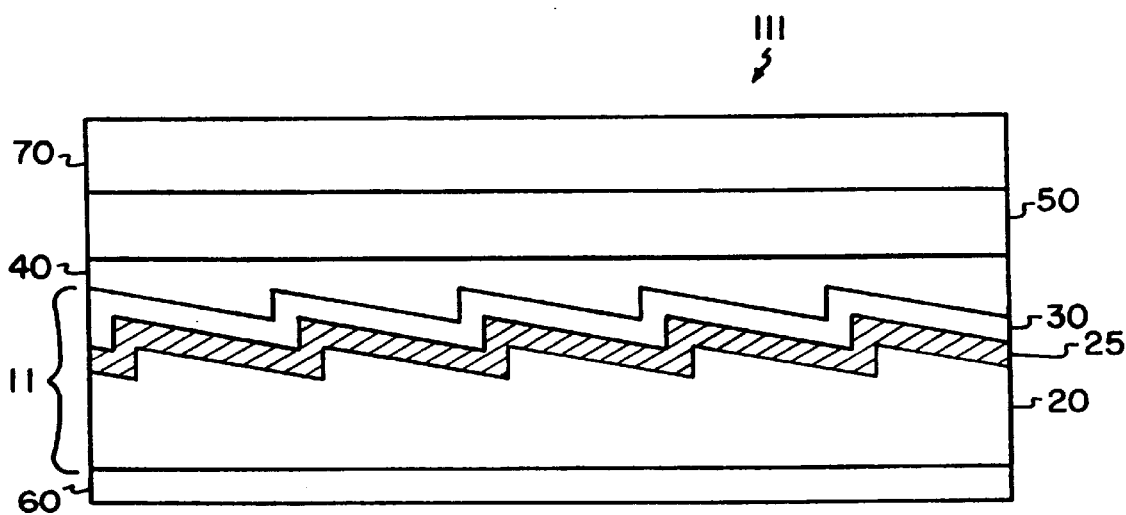
FIG. 4 is the light directing construction of FIG. 3 having optional layers disposed thereon.

In FIG. 4, light directing construction 11 (which includes light directing film 20, intermediate layer 25 and transflective metal coating 30) is incorporated into a light display apparatus 111. Light display apparatus 111 includes various layers in addition to light directing construction 11; light display apparatus 11 includes polymer protective layer 40, pressure sensitive adhesive layer 50, polymeric substrate 60, and polarizer 70. Each of these layers will be discussed later in detail.

Figure 5:
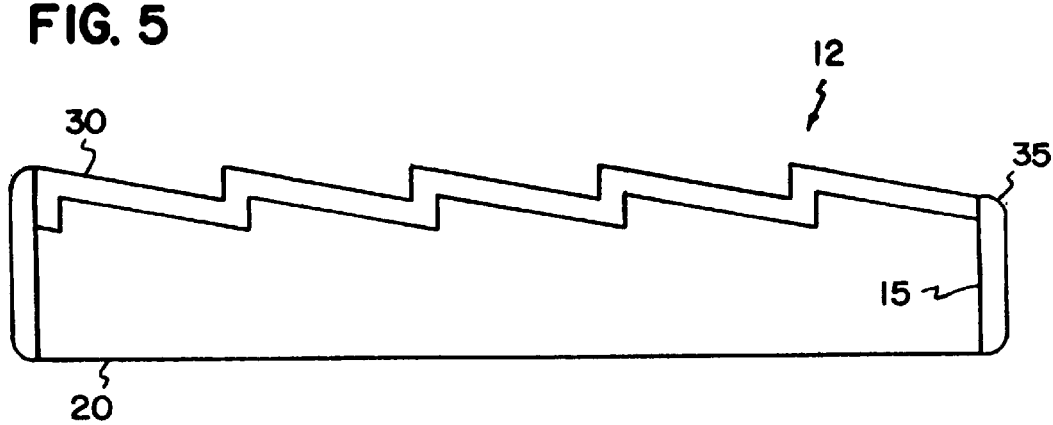
FIG. 5 is a cross-sectional view of a light directing construction according to a second embodiment of the present invention.

Referring to FIG. 5, a second embodiment of a corrosion resistant feature is shown. The corrosion resistant feature of light directing construction 12 is peripheral coating 35 disposed on the periphery 15 of the construction. One theory for halting the corrosion is to stop the migration of solution-borne salt ions to the metal coating/prismatic light directing film interface; this can be accomplished by providing a barrier around the exposed edges of the layers.

The side edge seal is preferably a coating of a polymeric material that extends around the edges of the light directing prismatic structure. Preferably, this coating is applied either simultaneously with or soon thereafter the structure is converted to its desired size and shape.

The peripheral coating 35 can be any polymeric material, such as a thermoplastic or a thermosetting material. The material may be UV polymerizable, moisture-curable, thermal curable, or the like. Examples of materials that can be used as peripheral coating 35 include epoxy and silicone. The material may be a liquid or a solid (such as a powder) when applied to periphery 15. The polymeric material may be applied to the periphery 15 by any known method, such as, for example, spraying coating, transfer coating, roll coating, manual coating with a brush, powder coating and other such methods.

In a preferred aspect, the polymeric peripheral coating is provided by using a laser beam, such as a $CO_2$ laser. The laser beam melts at least partially the outermost edges of the light directing construction, and any optional layers present within the construction, thereby creating flowable material that seals the outer edges of the construction. The laser beam can be used to simultaneously cut the light directing construction to a desired size and to provide the edge sealing. Any type of laser can be used for this embodiment; examples of typical lasers include a 50 Watt $CO_2$ laser and a 1000 Watt $CO_2$ laser.

Figure 6:
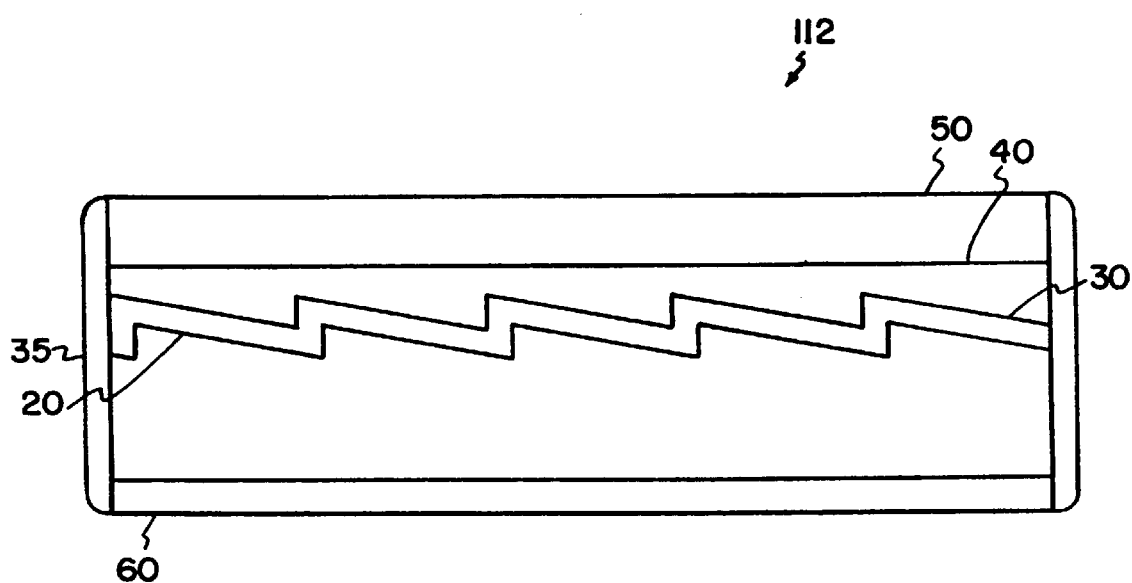
FIG. 6 is the light directing construction of FIG. 5 having optional layers disposed thereon.

In FIG. 6, light directing construction 12 (which includes light directing film 20, thin metal coating 30, and peripheral coating 35) is incorporated into a light display apparatus 112. Light display apparatus 112 includes various layers in addition to the light directing construction 12; light display apparatus 112 includes polymer protective layer 40, pressure sensitive adhesive layer 50, and polymeric substrate 60. Each of these layers is discussed in detail below.

Optional Layers

The light directing film includes optional layers, such as a pressure sensitive adhesive 50, a polymer protective layer 40, an inorganic protective layer (not shown), a polymeric substrate layer 60, and a polarizing layer 70. See for example, FIGS. 2, 4 and 6 for embodiments incorporating several of these optional layers. Additional layers, such as an inorganic protective layer, may be present within the light directing construction. Further, additional layers, such as release liners, silicone layers, and the like, may be present to protect the polymeric substrate 60 during shipping or after incorporation into the display apparatus.

In many instances, the light directing film will be manufactured and then sold to an assembler who provides the polarizing layer 70 and incorporates the construction into an apparatus. Thus, the light directing construction will be shipped with a release liner on the pressure sensitive adhesive layer 50.

In one embodiment of the present invention, the light directing film includes a polymer barrier layer or polymer protective layer 40. The polymer protective layer inhibits molecular transfer to the metal coating 30. The polymer protective layer may or may not be used in combination with an inorganic protective layer, which is described below. The polymer protective layer or polymer layer 40 is selected from the group consisting of cross-linked epoxy resin, cross-linked or linear acrylic resin, epoxy acrylate, polyester such as Vitel®, polyethylene, polyvinylidene chloride, and polyvinyl alcohol. One example of a cross-linked acrylic resin that may be used has the trade designation "B48N", produced by Rohm and Haas, 100 Independence Mall West, Philadelphia, Pa. 19106-2399.

If the polymer protective layer is used in combination with the inorganic protective layer, then the polymer protective layer 40 typically will be deposited on the inorganic protective layer. Where the polymer protective layer is used in a light directing film without the inorganic protective layer, then the polymer protective layer typically is deposited directly onto the metal coating, as shown in the constructions of FIGS. 2, 4 and 6.

The polymer protective layer may be formed using a variety of methods known in the art. For example, the polymer protective layer is preferably solution coated, in which case the thickness of the polymer protective layer 40 may range from about 0.01 micrometer to about 50 micrometers. The polymer protective layer may be conformably deposited on the metal coating or inorganic protective layer, or may planarize or partially planarize the underlying saw tooth formations.

Where the polymer protective layer 40 has a planarizing function, one side of the layer has tilted surfaces corresponding to the tilted surfaces of the prismatic structure, and a second side of the layer 40 is substantially planar. It is possible that the polymer protective layer 40 may include more than one layer. For example, if the polymer protective layer is intended to planarize the underlying prismatic structure, it may include more than one layer. Also, depending on the material that is used, more than one layer may be desirable to ensure that the polymer protective layer finctions as a proper barrier.

One possible method for forming the polymer protective layer 40 is vapor depositing volatile monomeric or oligomeric polymer precursors, and then curing the precursors. The deposition may take place at normal atmospheric pressure or under vacuum. Curing may be accomplished using either thermal, ultraviolet, or electron beam radiation, or plasma or corona exposure. One example of such a method for conformable deposition and some examples of specific materials are described in co-pending applications U.S. Ser. No. 09/259,100, titled "Retroreflective Articles Having Polymer Multilayer Reflective Coatings" and U.S. Ser. No. 09/259,487, titled "Method of Coating Microstructured Substrates with Polymeric Layer(s), Allowing Preservation of Surface Feature Profile", which are both incorporated by reference herein. Using the method described in these two above-referenced co-pending patent applications, a typical polymer protective layer would have a thickness of about 1 nm to about 2 micrometer. In some embodiments, this method may be preferred to solution coating the polymer protective layer, because the solvent used in solution coating may be detrimental to the metal coating or other layers of the display apparatus. The polymer protective layer could also be deposited using plasma processes such as plasma polymerization or plasma-enhanced chemical vapor deposition, as is known in the art.

One preferred material for the polymer protective layer 40 is solution-coated polymethyl methacrylate (PMMA) with a thickness of about 10 micrometers. The PMMA may include additives such as UV blockers and tarnish-inhibiting agents. One preferred additive to the PMMA is glycol dimercaptoacetate (GDA), a corrosion inhibitor for silver. This and other additives that may be used with the polymer protective layer are discussed in U.S. Pat. Nos. 4,307,150 and 4,645,714, which are hereby incorporated by reference herein. Alternatively, the polymer protective layer can include the UV-curable cross-linked epoxy acrylate described above as the preferred material for the prismatic structure.

The pressure sensitive adhesive 50 is preferably an optically diffuse layer. In one embodiment of the invention, the pressure sensitive adhesive layer 50 includes an acrylate acrylic acid adhesive. The adhesive may include optical diffuser particles, dispersed throughout the adhesive layer to improve the diffusive properties of the adhesive layer.

The pressure sensitive adhesive 50 may be of the type butyl acrylate/acrylic acid, having a ratio between 90/10 and 97/3, iso-octyl acrylate acrylic acid having a ratio between 90/10 and 97/3, or iso-octyl acrylate/acrylic acid/isobornyl acrylate/Regalrez 6108 having a ratio of approximately 66.3/0.67/13.4/19.3. The adhesive may be used in combination with one or more of bisamide cross-linker, benzoyl peroxide initiator, an aziridine cross-linker, a chlorinated cross-linker such as XL-330, Irgacure 651 cross-linker, or other standard acrylic adhesive cross-linkers. In addition, the adhesive may contain one or more of the following additives: benzotriazole, 5-amino benzotriazole, 5-butyl benzotriazole, benzotriazole 5-carboxylic acid, octadecyl thiol, or thiosilanes. One example of a pressure sensitive adhesive that may be used with the present invention is described in PCT WO 99/21913 (Kaytor et al.), which is hereby incorporated by reference. The diffusive quality of the pressure sensitive adhesive layer may be adjusted by modifying the concentration of diffusing particles suspended within the adhesive, depending on the specific level of diffusion that is desired.

Several of the embodiments of the present invention include a polymer substrate 60. The polymer substrate may be a material selected from the group consisting of PET, polyether sulphone (PES), polycarbonate, cellulose diacetate, and cellulose triacetate, and may be birefringent or non-birefringent. Preferably, the polymer substrate has a thickness of about 25 to 1000 micrometers.

Figure 7:
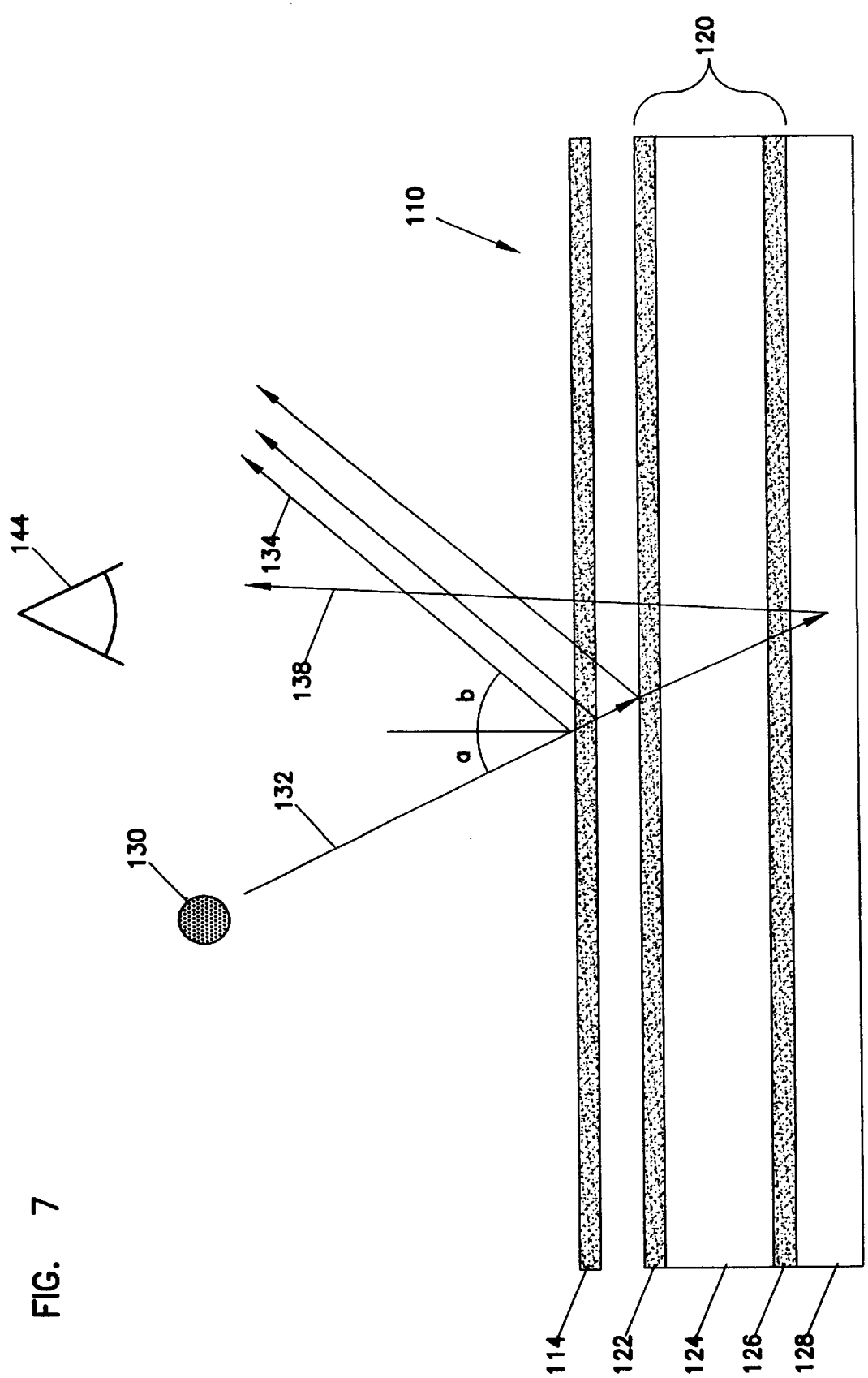
FIG. 7 is a cross-sectional view of a display apparatus incorporating a light directing construction according to the first embodiment of the present invention.

The light directing film and the light directing construction of the present invention can be incorporated into various display apparatuses. FIG. 7 illustrates a cross-section of one particular embodiment of a display 110 of the present invention including a lens or touch screen 114. The lens or touch screen 114 may receive input from the user of the display, or may contribute specific optical qualities to the display. The display further includes a light modulating layer 120, which includes a top polarizer 122, a liquid crystal layer 124, and a bottom polarizer 126. A light directing film 128 is attached to the bottom polarizer 126. Light directing film 128 can be any of the various embodiments of light directing film disclosed above. The light directing film of the present invention also may be incorporated into a display device that includes only one polarizer, although it more commonly will be used in a device having two polarizers that sandwich the liquid crystal layer. The light directing film 128 is provided to steer the image toward a desired viewing angle, which is substantially different than a glare angle of the display 110. The structure of the light directing film 128 has been discussed in detail above. The light directing film 128 also may be referred to as a beam steering film or tilted mirror film.

In the display apparatus shown in FIG. 7, an ambient light source 130 is illustrated, producing incoming ambient light rays 132. In this illustration, a light ray 132 from source 130 is incident on the display apparatus at angle a from the normal. The normal is the direction perpendicular to the display surface. A portion of the incoming light will be reflected as glare, illustrated by glare ray 134, by the top surface of the display apparatus 110. The glare ray 134 has a glare angle, b, from the normal. The glare image will be visible over a range of viewing angles, but will have a peak brightness at glare angle b. Angle a is equal to angle b, according to the law of reflection. Another portion of the incoming light will pass through the light modulating layer 120 and be reflected by the light directing film 128, as the display information or image, represented by image ray 138. The light directing film 128 is designed to direct the image ray 138 so that it will emerge from the display 110 at an angle from the normal that is substantially different than the glare angle b. The display image will also be visible over a range of viewing angles, and will have a peak brightness at a narrower range of viewing angles, centered around an "optimal viewing angle." In FIG. 7, the peak image angle or optimal viewing angle is nearly normal to the display, as represented by image ray 138. As a result, a viewer of the display apparatus 110 at position 144 can view the display image clearly without interference from the glare image. Further examples of display apparatuses are disclosed in U.S. patent application Ser. No. 09/425,765, filed Oct. 22, 1999, and incorporated herein by reference.

The invention will be further described and illustrated in the examples which follow. The examples are illustrative of the invention and should not be construed as limiting the scope to their details. All parts, percentages, ratios, etc. are by weight unless otherwise specified.

EXAMPLES

A prismatic light-directing film was prepared from a UV-curable epoxy-acrylate composition as follows:

Seventy-seven (77) parts bisphenol-A epoxy diacrylate (commercially available under the trade designation "CN-104" from Sartomer Company), heated to 60° C. for several hours, was gently blended with 20 parts of a mixture of 70% meta—and 30% para-isomers of methyl styrene (also referred to as vinyl toluene; commercially available from Monomer-Polymer & Dajac). Three (3.0) parts novolac epoxy triacrylate diluted 20% with tripropylene glycol diacrylate (commercially availed under the trade designation "Ebecryl 3603" from UCB Chemicals Corp.), which had been warmed at 65° C. for 1–2 hours, was blended into the epoxy diacrylate/epoxy triacrylate mixture, which had been maintained at 60° C. One and a half (1.5) parts diphenyl (2,4,6-trimethylberizoyl) phosphine oxide, a photoinitiator (commercially available under the trade designation "Lucirin™ TPO" from BASF), 3.0parts 1-hydroxycyclohexyl phenyl ketone, a photoinitiator (commercially available under the trade designation "Irgacure 184" from Ciba Chemicals), and 0.3 parts nonionic fluorinated alkyl ester (commercially available under the trade designation "FC-430" from 3M Company) were added, all the while keeping the mixture at 60° C. After the mixing was complete, the temperature was decreased to 55° C. and the mixture was gently stirred for 15–30 minutes to provide a coatable composition.

Films were prepared by placing the composition between a PET film and a metal drum master tool having a microreplicated prismatic pattern. The prismatic pattern was as shown in FIG. 1, with a tilt angle of 6 degrees, and a prism pitch of 50 $\mu$m (micrometers). The composition was coated onto the PET film by a die to give a coating thickness of 6–7 $\mu$m on the PET. The master tool was warmed to 60° C. (140° F.) and then pressed onto the coated PET so that the composition filled the cavities in the tool. The PET/composition/tool construction was passed under 600 watt/cm UV lamps at a speed of about 9.1 meters/minute (30 ft/min), with the UV radiation passing through the PET into the composition. The master tool was separated from the PET, which had a prismatic structure replicated on it. The prismatic film was then passed under a post-cure UV lamp, and through an annealing oven to remove any residual monomers.

A transflective silver layer (approximately 400 angstroms thick) was vapor deposited by sputtering onto the prismatic saw-tooth pattern. A PMMA polymer protective layer (approximately 10 micrometers thick) was coated from solution onto the silver layer, and then a light-diffusing butyl acrylate/acrylic acid adhesive (approximately 25 micrometers thick) was applied over the PMMA. The resulting construction had a visible light transmission of about 10% at 550 nm, as measured on a Perkin-Elmer Lambda 900 spectrophotometer against an air reference.

For the salt bath tests, described below, each prismatic light-directing construction was laminated to a bare soda-lime glass with the butyl acrylate/acrylic acid adhesive.

For the heat & humidity test, described below, each prismatic light-directing construction was laminated to a commercially available iodine-type absorbing polarizer (commercially available from Sanritz under the trade designation "LLC2-5518", or similar) with the butyl acrylate/acrylic acid adhesive. Bare soda-lime glass was then laminated to the polarizer. The sample construction tested included the polarizer positioned between the soda-lime glass and the prismatic light-directing construction, with the PET layer as an outermost layer.

Salt Bath Tests

For the salt bath tests, the film/glass construction was immersed in a heated, 20%-by-weight, aqueous sodium chloride solution. The temperature of the salt bath is reported in each test. The sample was visually evaluated approximately every 2 minutes for any indication of salt induced degradation occurring at the prismatic light-directing film and the transflective silver layer interface. For the overnight tests, the interface was evaluated only at the end of the test period.

Heat & Humidity Tests

For the heat and humidity tests, the film/polarizer/glass construction was placed in a humidity chamber having elevated temperature and relative humidity. The temperature and humidity are reported in each test. There was no deliberate introduction of sodium chloride or other salt to the environment except as noted.

The degradation of the silver layer on the film substrate was observed to occur in two stages. The initial stage was the appearance of dark or black spots beginning at the edges of the laminated structure film. The second was propagation of this condition into the film away from the edges; this condition was called "delamination".

Comparative Example A

Comparative Example A was a prismatic light-directing film as described above, having a vapor-deposited silver layer having a light transmission of about 10% at 550 nm, a PMMA layer, and an adhesive layer. Samples were laminated to soda-lime glass and to a polarizer, as described above; the prepared samples were tested for corrosion using the Salt Bath Tests and Heat & Humidity Test.

Salt Bath Tests

Comparative Example A failed by delamination propagating from the edge at the prismatic light-directing film/silver interface within 3 minutes upon immersion in the salt bath at 75° C.

A second sample failed by delamination propagating from the edge at the prismatic light-directing film/silver interface after exposure overnight, approximately 14 hours, in the salt bath at 50° C.

Heat & Humidity Tests

A third sample failed by the appearance of black spots of corrosion (precursors to delamination failure) propagating from the edge of the prismatic light-directing film/silver interface in less than 240 hours of exposure to a 70° C./95% relative humidity environment.

A similar sample, seeded at an edge with a 5 microliter aliquot of 10% sodium chloride solution in water, failed by the appearance of black spots of corrosion by delamination propagating from the edge at the prismatic light-directing film/silver interface in less than 240 hours of exposure to a 65° C./95% relative humidity environment.

Examples 1–8 demonstrate added resistance to salt corrosion through the use of an interceding oxidation-resistant layer between the prismatic light-directing film and the transflective silver layer.

Example 1

A light-directing transflective display film, as described in Comparative Example A above, was made, except that a 5 angstrom thick coating of "Lumalloy" alloy was vapor-deposited between the prismatic light-directing film and the silver layer. Samples were laminated to a polarizer and soda-lime glass as described above, and were tested.

Salt Bath Tests

Example 1 survived unchanged after 30 minutes in the salt bath at 75° C.

A similar sample failed by delamination propagating from the edge at the prismatic light-directing film/silver interface after exposure overnight, approximately 14 hours, in the salt bath at 50° C.

Heat & Humidity Test

A similar sample failed by the appearance of black spots of corrosion (precursors to delamination failure) propagating from the edge of the prismatic light-directing film/silver interface in less than 240 hours of exposure to a 70° C./95% relative humidity environment.

Example 2

Example 2 was prepared as described in Example 1, above, except that a 10 Å coating of "Lumalloy" alloy was deposited between the prismatic light-directing film and the silver layer.

Salt Bath Tests

Example 2 survived unchanged after 30 minutes in the salt bath at 75° C.

A similar sample survived unchanged after exposure overnight, approximately 14 hours, in the salt bath at 50° C.

Heat & Humidity Tests

A similar sample survived unchanged after 240 hours of exposure to a 70° C./95% relative humidity environment.

A similar sample also survived unchanged after 663 hours of exposure to a 65° C./95% relative humidity environment.

A similar sample, seeded at an edge with a 5 microliter aliquot of 10% sodium chloride solution in water and dried before exposure, failed by delamination propagating from the edge at the prismatic light-directing film/silver interface in less than 663 hours of exposure to a 65° C./95% relative humidity environment.

Example 3

Example 3 was prepared as described in Example 1, except that Example 3 had a 20 Å coating of "Lumalloy" alloy deposited between the prismatic light-directing film and the silver layer.

Salt Bath Tests

Example 3 survived unchanged after 30 minutes in the salt bath at 75° C.

A similar sample survived unchanged after exposure overnight, approximately 14 hours, in the salt bath at 50° C.

Heat & Humidity Test

A similar sample survived unchanged after 240 hours of exposure to a 70° C./95% relative humidity environment.

A similar sample also survived unchanged after 663 hours of exposure to a 65° C./95% relative humidity environment.

Example 4

Example 4 was prepared as Example 1, except that Example 4 had a 40 Å coating of "Lumalloy" alloy deposited between the prismatic light-directing film and the silver layer.

Salt Bath Tests

Example 4 survived unchanged after 30 minutes in the salt bath at 75° C.

A similar sample survived unchanged after exposure overnight, approximately 14 hours, in the salt water bath at 50° C.

Heat & Humidity Tests

A similar sample survived unchanged after 240 hours of exposure to a 70° C./95% relative humidity environment.

A similar sample also survived unchanged after 663 hours of exposure to a 65° C./95% relative humidity environment.

A similar sample, seeded at an edge with a 5 microliter aliquot of 10% sodium chloride solution in water and dried before exposure, survived unchanged after 663 hours of exposure to a 65° C./95% relative humidity environment.

Example 5

Example 5 was prepared as Example 1, except that Example 5 had a 10Å coating of "Inconel 600" alloy deposited between the prismatic light-directing film and the silver layer.

Salt Bath Tests

Example 5 survived unchanged after 30 minutes in the salt bath at 75° C.

A similar sample survived unchanged after exposure overnight, approximately 14 hours, in the salt bath at 50° C.

Example 6

Example 6 was prepared as Example 1, except that Example 6 had a 30 Å coating of "Inconel 600" alloy deposited between the prismatic light-directing film and the silver layer.

Salt Bath Tests

Example 6 survived unchanged after 30 minutes in the salt bath at 75° C.

A similar sample survived unchanged after exposure overnight, approximately 14 hours, in the salt bath at 50° C.

Heat & Humidity Test

A similar sample also survived unchanged after 330 hours of exposure to a 65° C./95% relative humidity environment.

Example 7

Example 7 was prepared as Example 1, except that Example 5 had a 10 Å coating of titanium deposited between the prismatic light-directing film and the silver layer.

Salt Bath Tests

Example 7 survived unchanged after 30 minutes in the salt bath at 75° C.

A similar sample failed by delamination propagating from the edge at the prismatic light-directing film/silver interface after exposure overnight, approximately 14 hours, in the salt bath at 50° C.

Heat & Humidity Test

A similar sample failed by the appearance of corrosion propagating from the edge of the prismatic light-directing film i silver interface in less than 240 hours of exposure to a 70° C./95% relative humidity environment.

Example 8

Example 8 was prepared as Example 1, except that Example 8 had a 40 Å coating of titanium deposited between the prismatic light-directing film and the silver layer.

Salt Bath Tests

Example 8 survived unchanged after 30 minutes in the salt bath at 75° C.

A similar sample survived unchanged after exposure overnight, approximately 14 hours, in the salt bath at 50° C.

Heat & Humidity Tests

A similar sample failed by the appearance of corrosion propagating from the edge of the prismatic light-directing film/silver interface in less than 240 hours of exposure to a 70° C./95% relative humidity environment.

A similar sample, seeded at an edge with a 5 microliter aliquot of 10% sodium chloride solution in water and dried before exposure, failed by the appearance of corrosion propagating from the edge at the prismatic light-directing film/silver interface in less than 240 hours of exposure to a 65° C./95% relative humidity environment.

Comparative Example B

Comparative Example B was prepared in the same manner as Comparative Example A. Samples of Comparative Example B were converted to size (~1"×1½") using a mechanical shear cutter, such as a guillotine cutter, suited to mass production. During cutting, a release liner was present on the butyl acrylate/acrylic acid adhesive. After being cut, the samples were laminated to the soda-lime glass and polarizer.

Salt Bath Tests

Comparative Example B failed by delamination at the epoxy acrylate/silver interface propagating from the edge within 3 minutes upon immersion in the salt bath at 75° C.

A similar sample failed by delamination at the prismatic light-directing film/silver interface propagating from the edge after exposure overnight, approximately 14 hours, in the salt bath at 50° C.

Heat & Humidity Tests

A similar sample failed by the appearance of black spots of corrosion (precursors to delamination failure) propagating from the edge of the prismatic light-directing film/silver interface in less than 240 hours of exposure to a 70° C./95% relative humidity environment.

A similar sample, seeded at an edge with a 5 microliter aliquot of 10% sodium chloride solution in water failed by delamination propagating from the marked edge at the epoxy acrylate/silver interface in less than 240 hours of exposure to a 65° C./95% relative humidity environment.

Examples 9–11 demonstrate added resistance to salt corrosion through the use of an edge seal induced by laser trimming of the film.

Example 9

Example 9 was prepared as Comparative Example B, except that Example 9 was cut to size with a 1000 Watt $CO_2$ laser. The laser was operated at 500 W with 100% duty cycle, at a frequency of 10 kHz, and at a cutting speed of 1.6 meters/second. During cutting with the laser, the sample was oriented so that the laser passed through the adhesive before the silver layer.

Salt Bath Tests

Example 10 survived unchanged after 17 minutes in the salt bath at 75° C.

A similar sample survived unchanged after exposure overnight, approximately 14 hours, in the salt bath at 50° C.

Heat & Humidity Tests

A similar sample survived unchanged after 331 hours of exposure to a 65° C./95% relative humidity environment.

A similar sample, seeded at an edge with a 5 microliter aliquot of 10% sodium chloride solution in water survived unchanged in the area of seeding, but experienced failure by the appearance of black spots of corrosion by delamination propagating from the edge at the prismatic light-directing film/silver interface in another area, in less than 331 hours of exposure to a 65° C./95% relative humidity environment.

Example 10

Example 10 was prepared similar to Example 9, except that Example 10 was cut so that the laser passed through the silver layer before the adhesive.

Salt Bath Tests

Example 10 survived unchanged after 17 minutes in the salt bath at 75° C.

A similar sample survived unchanged after exposure overnight, approximately 14 hours, in the salt bath at 50° C.

Heat & Humidity Tests

A similar sample survived unchanged after 331 hours of exposure to a 65° C./95% relative humidity environment.

A similar sample, seeded at an edge with a 5 microliter aliquot of 10% sodium chloride solution in water, failed by the appearance of a black spot of corrosion by delamination propagating from the edge at the prismatic light-directing film/silver interface in the area of the salt seeding, in less than 331 hours of exposure to a 65° C./95% relative humidity environment.

Example 11

Example 11 was prepared similar to Example 10, with the laser penetrating the silver layer before the adhesive, except the cutting parameters were chosen so as not to cut the release liner on the adhesive.

Salt Bath Tests

Example 11 survived unchanged after 17 minutes in the salt bath at 75° C.

A similar sample failed by delamination at the prismatic light-directing film/silver interface propagating from the edge after exposure overnight, approximately 14 hours, in the salt bath at 50° C.

Heat & Humidity Tests

A similar sample survived unchanged after 240 hours of exposure to a 70° C./95% relative humidity environment.

A similar sample, seeded at an edge with a 5 microliter aliquot of 10% sodium chloride solution in water failed by delamination propagating from the marked edge at the prismatic light-directing film/silver interface in less than 331 hours of exposure to a 65° C./95% relative humidity environment.

The present invention should not be considered limited to the particular examples described above, but rather should be understood to cover all aspects of the invention as set out in the attached claims. Various modifications, equivalent processes, as well as numerous structures to which the present invention may be applicable will be readily apparent to those of skill in the art upon review of the present specification. The claims are intended to cover such modifications and devices.

We claim:

1. A light directing construction, comprising:
   (a) a prismatic structure having first and second surfaces, the second surface including saw-tooth formations having tilted surfaces; the prismatic structure made from a non-halogenated UV polymerizable composition;
   (b) a transflective metal coating provided proximate to the saw-tooth formations, the transflective metal coating having a transmission of at least 10% of visible light; and
   (c) a corrosion resistant intermediate layer present between the transflective metal coating and the prismatic structure, the corrosion resistant layer providing a decrease in the sum of transmission and reflection of visible light of less than 5%.

2. The light directing construction of claim 1 wherein the corrosion resistant layer provides a decrease in the sum of transmission and reflection of visible light of less than 2%.

3. The light directing construction of claim 1 wherein the UV polymerizable composition comprises a cross-linked epoxy acrylate.

4. The light directing construction of claim 3 wherein the UV polymerizable composition comprises bisphenol-A epoxy diacrylate, at a weight percent of about 55–80% of the total UV-curable resin material; methyl styrene, at a weight percent of about 5–25% of the total UV-curable resin material; acrylated epoxy, at a weight percent of about 1–10% of the total UV-curable resin material; a photoinitiator, at a weight percent of about 0.25–5% of the total UV-curable resin material; and a fluorosurfactant, at a weight percent of about 0.1–0.3% of the total UV-curable resin material.

5. The light directing construction of claim 1 wherein the transflective metal coating comprises a material selected from a group consisting of silver, chromium, nickel, aluminum, titanium, gold, zirconium, platinum, palladium, rhodium, and alloys thereof.

6. The light directing construction of claim 5 wherein the transflective metal coating comprises silver.

7. The light directing construction of claim 5 wherein the tranflective metal coating has a thickness of about 300 angstroms to about 400 angstroms.

8. The light directing construction of claim 1 wherein the corrosion resistant layer comprises a material selected from the group consisting of chromium, nickel, iron, aluminum, titanium, silver, gold, haffiium, zirconium, tantalum, niobium, tungsten, platinum, vanadium, molybdenum, tin, palladium, rhodium, and alloys thereof.

9. The light directing construction of claim 8 wherein the corrosion resistant layer comprises a nickel-chromium alloy.

10. The light directing construction of claim 9 wherein the corrosion resistant layer comprises a nickel-chromium-iron alloy.

11. The light directing construction of claim 1 further comprising:
   (a) a pressure sensitive adhesive layer formed on the inorganic protective layer; and
   (b) a polarizer disposed on the pressure sensitive adhesive layer.

12. The light directing construction of claim 11, wherein the pressure sensitive adhesive layer comprises an acrylate acrylic acid adhesive layer, the adhesive layer being optically diffuse, and wherein the adhesive layer inhibits damage to the metal coating.

13. The light directing construction of claim 12, wherein the pressure sensitive adhesive layer includes optical diffuser particles.

14. The light directing construction of claim 1 further comprising:
   (a) a polymer protective layer;
   (b) a pressure sensitive adhesive layer formed on the polymer protective layer; and
   (c) a polarizer disposed on the pressure sensitive adhesive layer.

15. The light directing construction of claim 14, wherein the polymer protective layer is selected from a group consisting of polyester, soluble polyester, cross-linked epoxy resin, acrylic resin, epoxy acrylate, polyethylene, polyvinylidene chloride, polyvinyl alcohol and polymethyl methacrylate.

16. The light directing construction of claim 14 wherein the polymer protective layer has a thickness of about 1 nanometer to 25 micrometers.

17. The light directing construction of claim 14, wherein the polymer protective layer includes one side having tilted surfaces corresponding to the tilted surfaces of the prismatic structure and a second side being substantially planar.

18. The light directing construction of claim 14, wherein the polymer protective layer includes polymethyl methacrylate.

19. The light directing construction of claim 1, further comprising a polymer substrate disposed on the first surface, the polymer substrate comprising a material selected from the group of PET, polyether sulphone, polycarbonate, cellulose diacetate, and cellulose triacetate.

20. The light directing construction of claim 19, the polymer substrate having a thickness of greater than or equal to about 25 micrometers and less than or equal to about 1000 micrometers.

21. The light directing construction of claim 1, wherein the prismatic layer includes tilted surfaces with a tilt angle of about 6° to about 9°.

22. The light directing construction of claim 1, wherein the saw-tooth formations have a repeat distance of about 30 micrometers to about 80 micrometers.

* * * * *

UNITED STATES PATENT AND TRADEMARK OFFICE
CERTIFICATE OF CORRECTION

PATENT NO. : 6,626,545 B2
DATED : September 30, 2003
INVENTOR(S) : Gardner, Timothy J.

It is certified that error appears in the above-identified patent and that said Letters Patent is hereby corrected as shown below:

Title page,
Item [60], Related U.S. Application Data, delete "division" and insert -- divisional --, therefore.
Item [57], ABSTRACT,
Line 14, delete "constriction" and insert -- construction --, therefore.
Item [56], References Cited, OTHER PUBLICATIONS, "Clabburn, R.J.T. et a.," reference, delete "et a.," and insert -- et al. --; and delete "Difusers" and insert -- Diffusers --, therefore.

Column 2,
Line 56, delete "furthers" and insert -- further --, therefore.

Column 4,
Line 12, (approx.), delete "titled" and insert -- tilted --, therefore.

Column 5,
Line 52, delete "6-7" and insert -- 5-7 --, therefore.
Line 53, delete "titled" and insert -- tilted --, therefore.

Column 7,
Line 36, (approx.), delete "of" before "light".
Line 46, after "resistant" insert -- feature, such as an --, therefore.
Line 47, delete "–at" and insert -- at --, therefore.

Column 8,
Line 19, (approx.), delete "of" before "light".
Line 34, (approx.), delete "Lumalloy" and insert -- Lumalloy$^{TM}$ --, therefore.
Line 36, (approx.), delete "Inconel" and insert -- Inconel 600 --, therefore.
Line 43, (approx.), delete "11" and insert -- 111 --, therefore.
Line 66, delete "The polymeric material may be applied to the periphery 15 by any known method, such as, for example, spraying coating, transfer coating, roll coating, manual coating with a brush, powder coating and other such methods." And insert the same on line 67 as new paragraph.

Column 10,
Lines 58-59 and 64, (approx.), delete "acrylate acrylic" and insert -- acrylate/acylic --, therefore.

UNITED STATES PATENT AND TRADEMARK OFFICE
CERTIFICATE OF CORRECTION

PATENT NO. : 6,626,545 B2
DATED : September 30, 2003
INVENTOR(S) : Gardner, Timothy J.

It is certified that error appears in the above-identified patent and that said Letters Patent is hereby corrected as shown below:

Column 11.
Line 57, after "Another" delete ",".

Column 12,
Line 33, (approx.), delete "3.0parts" and insert -- 3.0 parts --, therefore.
Line 48, delete "6-7" and insert -- 5-7 --, therefore.

Column 13,
Line 60, delete "95º" and insert -- 95% --, therefore.

Column 14,
Lines 8, 28 and 49, (approx.), delete "Lumalloy" and insert -- Lumalloy$^{TM}$ --;
Line 65, delete "Lumalloy" and insert -- Lumalloy$^{TM}$ --, therefore.

Column 15,
Line 58, (approx.), delete "i" and insert -- / --, therefore.

Column 18,
Line 28, delete "tranflective" and insert -- transflective --, therefore.
Line 33, delete "haffiium" and insert -- hafnium --, therefore.

Signed and Sealed this

Fourteenth Day of September, 2004

JON W. DUDAS
*Director of the United States Patent and Trademark Office*